United States Patent [19]

Gottschalk

[11] Patent Number: 4,901,447
[45] Date of Patent: Feb. 20, 1990

[54] ELECTRICAL OUTLET AND SWITCHBOX POSITIONING DEVICE

[76] Inventor: Larry E. Gottschalk, P.O. Box 435, Saint Marys, Ohio 45885

[21] Appl. No.: 275,572

[22] Filed: Nov. 23, 1988

[51] Int. Cl.⁴ .................. B25B 11/00; B25B 1/00
[52] U.S. Cl. .................. 33/613; 33/DIG. 10; 269/6
[58] Field of Search .......... 33/DIG. 10, 613, 528; 269/6, 50; 220/3.2, 3.9; 248/DIG. 6

[56] References Cited
U.S. PATENT DOCUMENTS

| | | | |
|---|---|---|---|
| 2,956,798 | 10/1960 | Briggs | 33/DIG. 10 |
| 2,990,172 | 6/1961 | Gianotta | 33/DIG. 10 |
| 3,150,304 | 10/1964 | Crawford | 33/DIG. 10 |
| 3,436,070 | 4/1969 | Utley et al. | 33/DIG. 1 |

Primary Examiner—Harry N. Haroian
Attorney, Agent, or Firm—Frank B. Robb

[57] ABSTRACT

A device for positioning an outlet or switch box on a wall member for connection and use in the electrical system, the device having parts to grip and locate a box of any preferred form in various positions both inwardly and outwardly and upwardly and downwardly while the box is being secured in its preferred location within the wall construction.

4 Claims, 1 Drawing Sheet

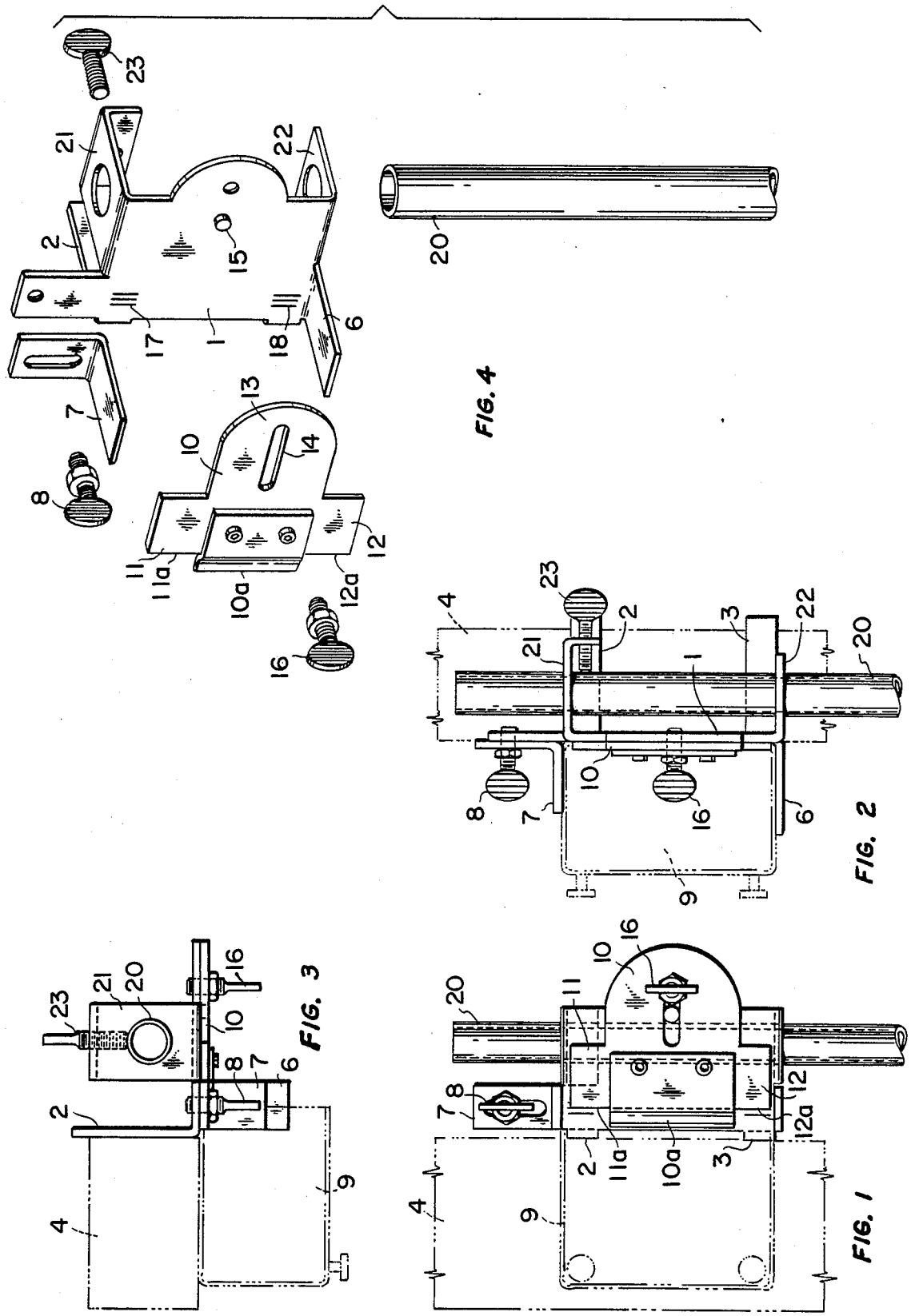

ELECTRICAL OUTLET AND SWITCHBOX POSITIONING DEVICE

BACKGROUND OF THE INVENTION

This invention relates to electrical outlet and switch box positioning devices, and particularly to a device which is flexible enough to set at a predetermined position to assist in locating switch and outlet boxes within a wall as is usually the case during construction of a building or the like before the wall covering such as drywall is placed thereon, when the wall studs are exposed so that the boxes can be nailed or otherwise fastened thereto.

It is desirable to have the various boxes whether for switches or outlets at uniform heights throughout a particular area, and there are certain desirable heights that have been determined to be best or even specified by building codes, to be followed in the installation process in such houses or buildings which use such devices.

It is therefore a primary object of this invention to provide a flexible device for installing such boxes, which device is of relatively simple construction and can be used by an electrician carrying the same from place to place without difficulty or of complicated set up demands.

The device is flexible enough to accommodate for positioning of the boxes of whatever kind in various locations.

DETAILED DESCRIPTION OF THE INVENTION

With the foregoing in mind, the present invention is a device which is availed of to accept boxes of different kinds, locating the same with the device so that when the device is positioned with respect to a stud or the like, the box supported thereby will be uniformly positioned vertically and within the body of the wall, so that it is located properly for making the electrical connections thereto.

This involves the provision of a body which is formed of flat material and from which extend certain legs and other instrumentalities that are useful in not only maintaining the box in position for fastening, but within the wall at a desired depth and at the correct vertical height on a stud, and in a manner which does not require the box to be held by hand while fastening is effected, the box being held by the device, so that fastening can be easily resorted to in its proper location.

With the understanding established by the foregoing, the device thereof is shown in the drawing wherein:

FIG. 1 is a view partly in phantom by dotted lines to illustrate the positioning which the device will provide and certain of the elements thereof to locate a box as desired.

FIG. 2 is a view similar to FIG. 1, but at right angle thereto.

FIG. 3 is a plan view to show the positions of the device and relationship to an electrical box.

FIG. 4 is an exploded view showing the device with its various parts in their related positions and as the device is adapted to be supported on a leg by which the height of installation of an electrical box will be determined.

Turning now to the drawing it is noted that the device hereof comprises a body generally denoted 1 which is basically a flat member and has certain bent up or bent out parts and forms, the purpose of which will be understood as this description proceeds.

The body includes a pair of flat parts or stud engaging legs, the upper one denoted 2 and the lower one denoted 3, such parts being provided to engage a stud or part of the frame of a building, the stud shown in fragmentary dotted lines at 4, in the various Figures.

As will be understood, an outlet box is of generally rectilinear configuration having an open side, and whether of plastic or metal, the outlet or switch being ultimately positioned therewithin and within opening, and as such is gripped by the device hereof by means of gripping means, a lower one designated 6 and an upper one designated 7, the lower means being integral with the body 1 and extending out of the plane thereof at about right angles thereto.

The part 7 is adjustable upwardly and downwardly and by means of a thumb screw 8 may be fastened in the proper position, and as such arranged to grip the box 9 therebetween, the thumb screw 8 being tightened to hold the box in the desired position.

To hold the box between the parts 6 and 7, a clamping element 10 is provided, arranged so that by means of its configuration as a flat part with tongue areas 11 and 12 extending therefrom in the plane thereof, and a part 13 which includes an elongated slot 14 therein to engage a pin 15 on the body 1.

A thumb screw 16 is arranged to hold the element 10 in the position of FIG. 1 against the surface of the body, the element may thus be moved back and forth for adjusting purposes. Thus in cooperation with certain gauge marks, three in number in this disclosure, and designated at 17 for the upper ones and 18 for the lower marks, to cooperate with the edge of the tongues 11 and 12 designated 11a and 12a to thereby establish the depth at which the box is to be secured, within the wall formed by the studs.

The edges 11a and 12a are related to the marks 17 and 18, to show the depth or thickness of the wall covering such as drywall or other material used for covering the studs to form the finished wall.

The marks may establish any preferred increments for the positioning just before described.

In order to support the device in a vertical location a leg designated 20 is supplied as by a piece of electrical conduit or tubing as shown, adapted to be received in certain leg receiving parts 21 for the upper part and 22 for the lower edge of the body 1.

The entire device is supported on the leg at any preferred position by a thumb screw 23 engaging the conduit or leg part 20 as may be desirably predetermined, and infinitely variable therealong.

The clamping element 10 is provided with a portion 10a which engages an edge or lip of a box 9 and holding the box between the gripping means 6 and 7 in their adjusted position.

The body is adjusted on the leg 20 at the desired position and as shown in FIG. 3 and by engaging the legs 2 and 3 against a stud 4, and in cooperation with the side of a box 9, locates the box and facilitates the fastening of the same to a stud 4.

The various thumb screws make possible suitable adjustment of the various parts to accommodate for different size boxes and the locating of the device for its intended purpose.

I claim:

1. An outlet box positioning device comprising a body having a planar portion from which legs extend about at right angles to engage a stud, means carried by the body to releasably support an outlet box in position for fastening to a wall stud or the like, gauge marks on said body to locate such box within the outlet of a wall or the like, gripping means extending from the body to maintain such box in fastening positioning, a clamping element adjustably mounted on said body to locate such box as to depth of position within such wall, the legs comprising a pair of flat parts to engage the stud at right angles to the wall mounting surface thereof, the gripping means being positioned to engage the top and bottom surfaces of an outlet box, to maintain the same at right angles to the flat parts aforesaid, one of said gripping means being adjustable to accommodate different size boxes, the clamping element being slidably mounted on the body to move inwardly and outwardly thereto and including a lip portion to releasably engage a box at an edge of its open area, a leg on which the body is supported, and means to maintain said body on the leg in various positions.

2. An outlet positioning device comprising a body having a planar portion from which legs extend about at right angles to engage a stud, means carried by the body to releasably support an outlet box in position for fastening to a wall stud or the like, gauge marks on said body to locate such box within the outline of a wall or the like, gripping means extending from the body to maintain such box in fastening position, a clamping element adjustably mounted on said body to locate such box as to depth of position within such wall, the legs comprise a pair of flat parts to engage such stud at right angles to the wall mounting surface thereof, the gripping means are positioned to engage the top and bottom surfaces of an outlet box, to maintain the same at right angles to the flat parts aforesaid, one of said gripping means being adjustable to accommodate different size boxes, the clamping element is slidably mounted on the body to move inwardly and outwardly relative thereto, and includes a lip portion to releasably engage a box at an edge of its open area, and leg receiving parts offstanding from the body to receive a leg therein, a leg in said parts, means on one of said parts to engage the leg and maintain the device in predetermined position with respect to a reference area engaged by said leg.

3. A device as claimed in claim 1, wherein one of said gripping means being adjustable to accommodate different size boxes, and the clamping element is slidably mounted on the body to move inwardly and outwardly relative thereto, and includes a lip portion to releasably engage a box at an edge of its open area, leg receiving parts offstanding from the body to receive a leg therein, a leg in said parts, means on at least one of said parts to engage the leg to maintain the device in predetermined position with respect to a reference area engaged by said leg, said receiving parts extend at right angles with respect to the body in about the same direction as the stud engaging parts, and include a thumb screw adjustable to engage the leg for locating the device in an infinite number of positions thereon.

4. A device as claimed in claim 3, wherein an adjustable part is mounted on the body to move upwardly and downwardly thereon, to engage an upper portion of a box, and a thumb screw is provided to maintain the adjustable part in box engaging position.

* * * * *